US009987969B1

(12) United States Patent
Welter et al.

(10) Patent No.: US 9,987,969 B1
(45) Date of Patent: Jun. 5, 2018

(54) VEHICLE INTEGRATED FASTENING SYSTEM

(71) Applicant: AISIN TECHNICAL CENTER OF AMERICA, INC., Northville, MI (US)

(72) Inventors: Aaron Welter, Livonia, MI (US); Eric Archambeau, South Lyon, MI (US); Yasuaki Nishio, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days. days.

(21) Appl. No.: 15/819,002

(22) Filed: Nov. 21, 2017

(51) Int. Cl.
   *B60P 7/08* (2006.01)

(52) U.S. Cl.
   CPC .................. *B60P 7/0838* (2013.01)

(58) Field of Classification Search
   CPC ...... B60P 7/0838; B60P 7/0823; B60R 22/18; F16G 15/00
   USPC .............. 410/12, 100, 103, 106; 24/265 CD, 24/70 ST, 69 ST, 69 CT, 71 ST; 254/223, 254/237, 238
   See application file for complete search history.

(56) References Cited

U.S. PATENT DOCUMENTS

| | | | |
|---|---|---|---|
| 6,059,499 A | 5/2000 | Bird | |
| 6,416,265 B1 * | 7/2002 | Flores | B60P 7/0807 410/106 |
| 6,793,449 B1 | 9/2004 | Simpson et al. | |
| 7,431,548 B2 | 10/2008 | Acton et al. | |
| 8,376,674 B1 | 2/2013 | Davis, III | |
| 2006/0188354 A1 * | 8/2006 | Bosley | B60P 3/079 410/23 |

* cited by examiner

*Primary Examiner* — Stephen Gordon
(74) *Attorney, Agent, or Firm* — Oblon, McClelland, Maier & Neustadt, L.L.P.

(57) ABSTRACT

A fastening device integrated into a vehicle to fasten a cargo including a strap assembly with a strap, and a hook affixed to a first extremity of the strap, a shaft assembly affixed to a second extremity of the strap to roll the strap, a ratchet assembly to prevent rotation of the shaft assembly in an unrolling direction when engaged, a handle assembly to engage and force the ratchet assembly to rotate, a housing assembly affixed to the body of the vehicle to support the shaft assembly, and the handle assembly, a head cover to cover the shaft assembly, the ratchet assembly, and the housing assembly and provide access to the handle assembly, a neck cover that protrudes downwardly from the head cover to receive the strap and the hook, wherein the handle assembly is articulable to engage the ratchet assembly and tighten the strap around the cargo.

20 Claims, 5 Drawing Sheets

VEHICLE INTEGRATED FASTENING SYSTEM

BACKGROUND

Field of the Disclosure

The present disclosure relates to fastening system for vehicles.

Description of the Related Art

Today's vehicles and notably light to heavy duty vehicles such as pick-up trucks are often used to transport a cargo that requires to be fasten to the vehicle.

Such a demand in fastening cargo can be address with ties, e.g. straps, ropes, bungee cords, or the like that are tied to the vehicles. However, these ties are often not available, misplaced, lost, and/or provide weak tightening and anchorage to the vehicles.

To this end, conventional fastening devices integrated to vehicles have been employed. Although such conventional fastening devices are widely used they present important drawbacks.

For example, U.S. Pat. No. 8,376,674 B1 describes a cargo strap assembly which fits into a stake pocket of a vehicle. Although U.S. Pat. No. 8,376,674 B1 provides an integrated fastening assembly, this assembly can only be used in the stake pocket and eliminates the use of the stake pocket itself.

In another example, U.S. Pat. No. 7,431,548 B2 describes a restraint device recessed into a floor of a vehicle. Although U.S. Pat. No. 7,431,548 B2 provides an integrated fastening assembly, this assembly requires floor modifications and may compromise the strength or integrity of the floor.

In another example, U.S. Pat. No. 6,793,449 B1 describes a tie down cord assembly which can be stored in the interior side wall of an interior cargo area. Although U.S. Pat. No. 6,793,449 B1 provides an integrated fastening assembly, this assembly is limited to interior vehicle use and cannot actively be used to tie down a cargo.

In a last example, U.S. Pat. No. 6,059,499 A describes a spool assembly with a strap and coupler inside a housing consisting of a threaded post and a pair of clamps for removing and attaching the housing to vehicle. Although U.S. Pat. No. 6,059,499 A provides an integrated fastening assembly, this assembly relies on the pair clamps for removably and fixedly mounting to the vehicle which may not provide sufficient anchorage to the vehicle and may not be suitable for heavy tightening.

Thus, an integrable fastening system solving the aforementioned limitations is desired.

SUMMARY

Accordingly, the object of the present disclosure is to provide a fastening system for securing a cargo in a vehicle which overcomes the above-mentioned limitations.

In one non-limiting illustrative example, a fastening device integrated into a vehicle to fasten a cargo. The fastening device includes a strap assembly having a strap, and a hook affixed to a first extremity of the strap, a shaft assembly affixed to a second extremity of the strap to roll the strap, a ratchet assembly to prevent rotation of the shaft assembly in an unrolling direction when engaged, a handle assembly to engage and force the ratchet assembly to rotate, a housing assembly affixed to the body of the vehicle to support the shaft assembly, and the handle assembly, a head cover to cover the shaft assembly, the ratchet assembly, and the housing assembly and provide access to the handle assembly, a neck cover that protrudes downwardly from the head cover to receive the strap and the hook, wherein the handle assembly is articulable to engage the ratchet assembly and tighten the strap around the cargo.

In another non-limiting illustrative example, a fastening device integrated into a vehicle to fasten a cargo. The fastening device includes a strap assembly having a strap, and a hook affixed to a first extremity of the strap, a shaft assembly affixed to a second extremity of the strap to roll the strap, a ratchet assembly to prevent rotation of the shaft assembly in an unrolling direction when engaged and allow rotation of the shaft assembly in the unrolling direction when disengaged, a handle assembly to engage and force the ratchet assembly to rotate, a spring assembly to exert a rewinding force on the shaft assembly, a housing assembly affixed to the body of the vehicle to support the shaft assembly, the handle assembly, and the spring assembly, a head cover to cover the shaft assembly, the ratchet assembly, the spring assembly, and the housing assembly and provide access to the handle assembly, a neck cover that protrudes downwardly from the head cover to receive the strap and the hook, wherein the handle assembly is articulable to engage the ratchet assembly and tighten the strap around the cargo or disengage the ratchet assembly and rewind the strap assembly around the shaft assembly.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
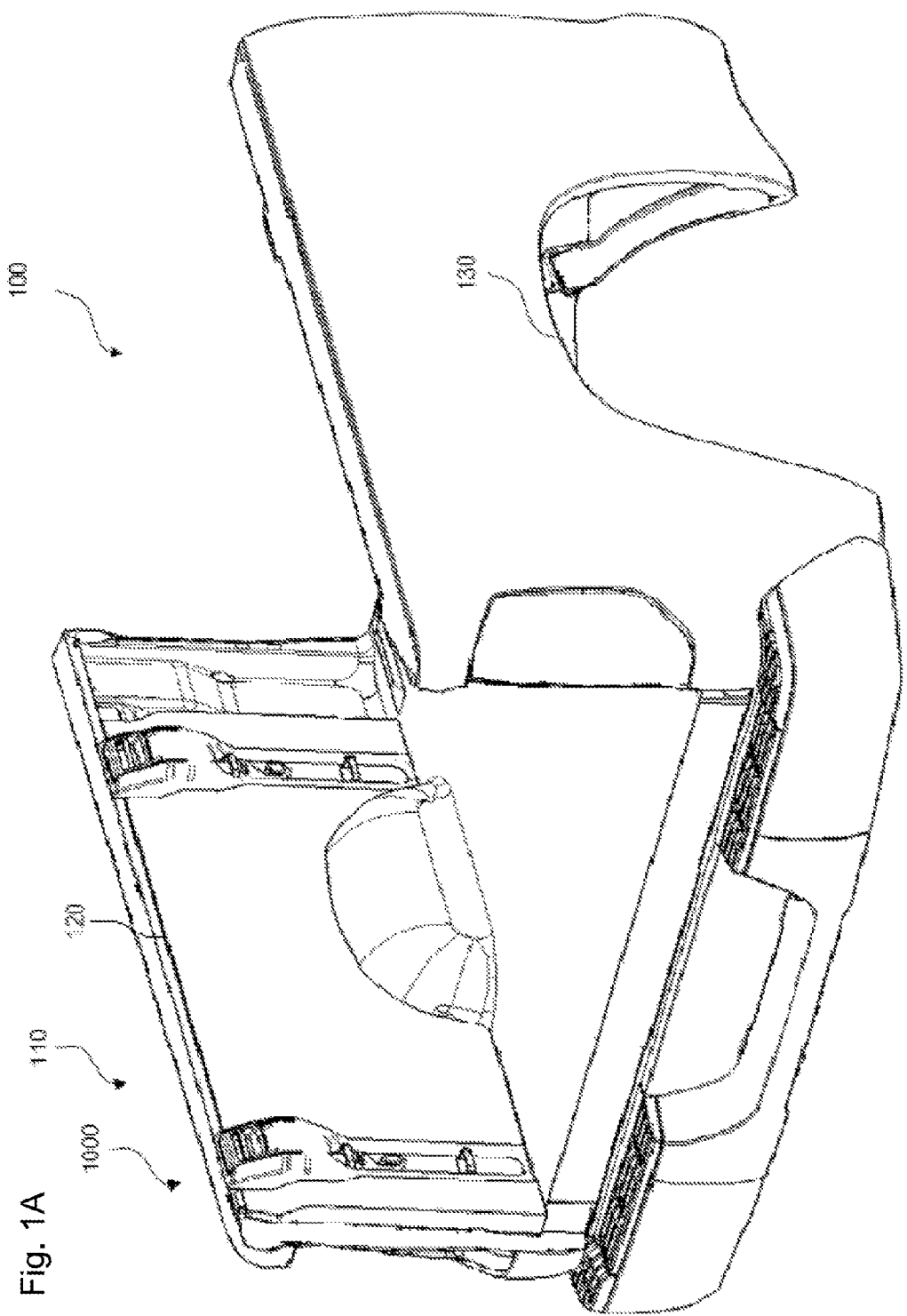
FIG. 1A is a perspective view of a fastening system integrated in a vehicle, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1B:
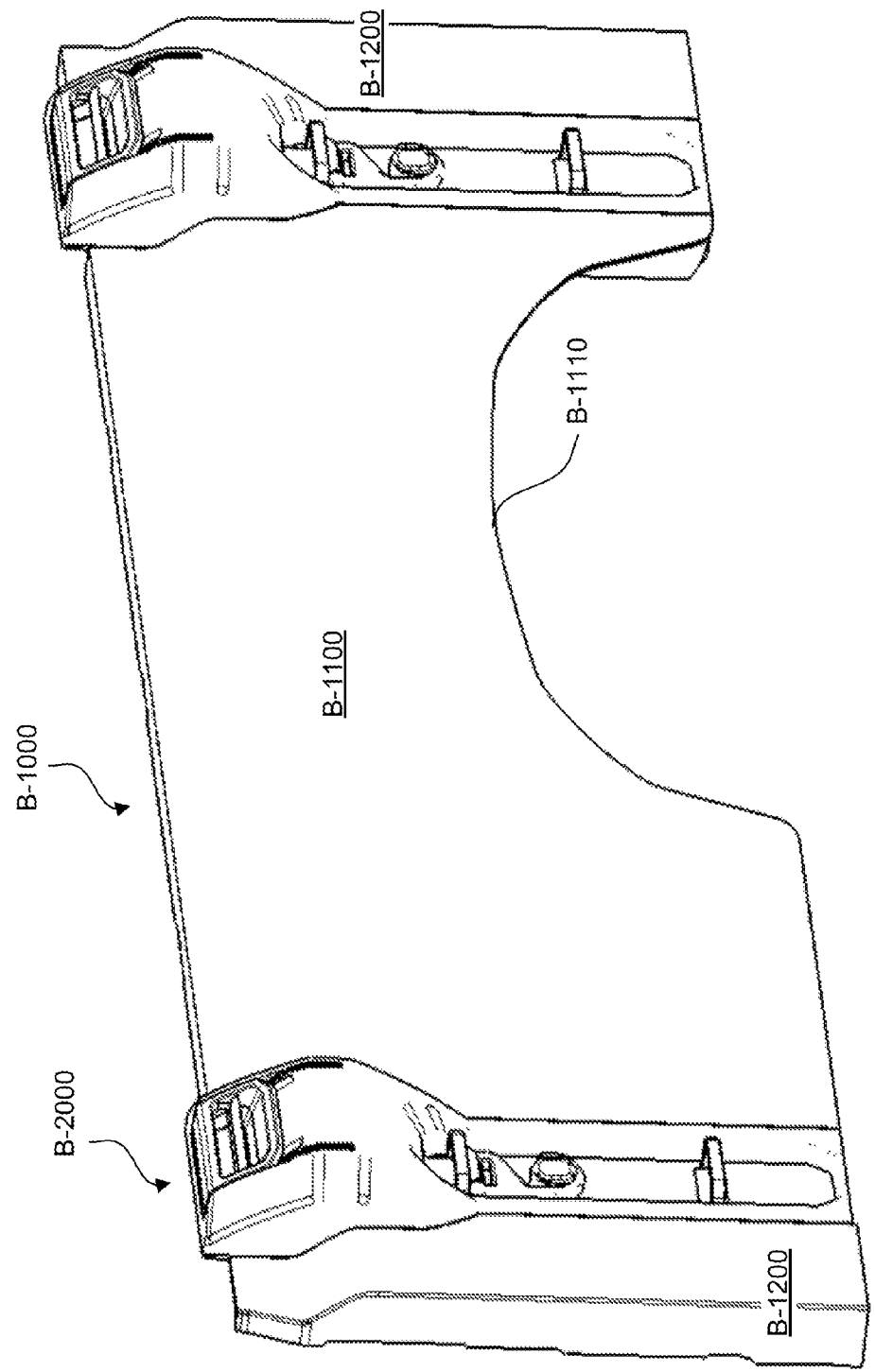
FIG. 1B is a perspective view of a tie down assembly, a side cover assembly, and top cover assembly of the fastening device, according to certain aspects of the disclosure.

FIGS. 1A-1B is a perspective view of a fastening system integrated in a vehicle, according to certain aspects of the disclosure.

The fastening device 1000 of the present disclosure provides means to fasten a cargo inside a vehicle 100 that is integrable into a body 110 of the vehicle 100.

Figure 2A:
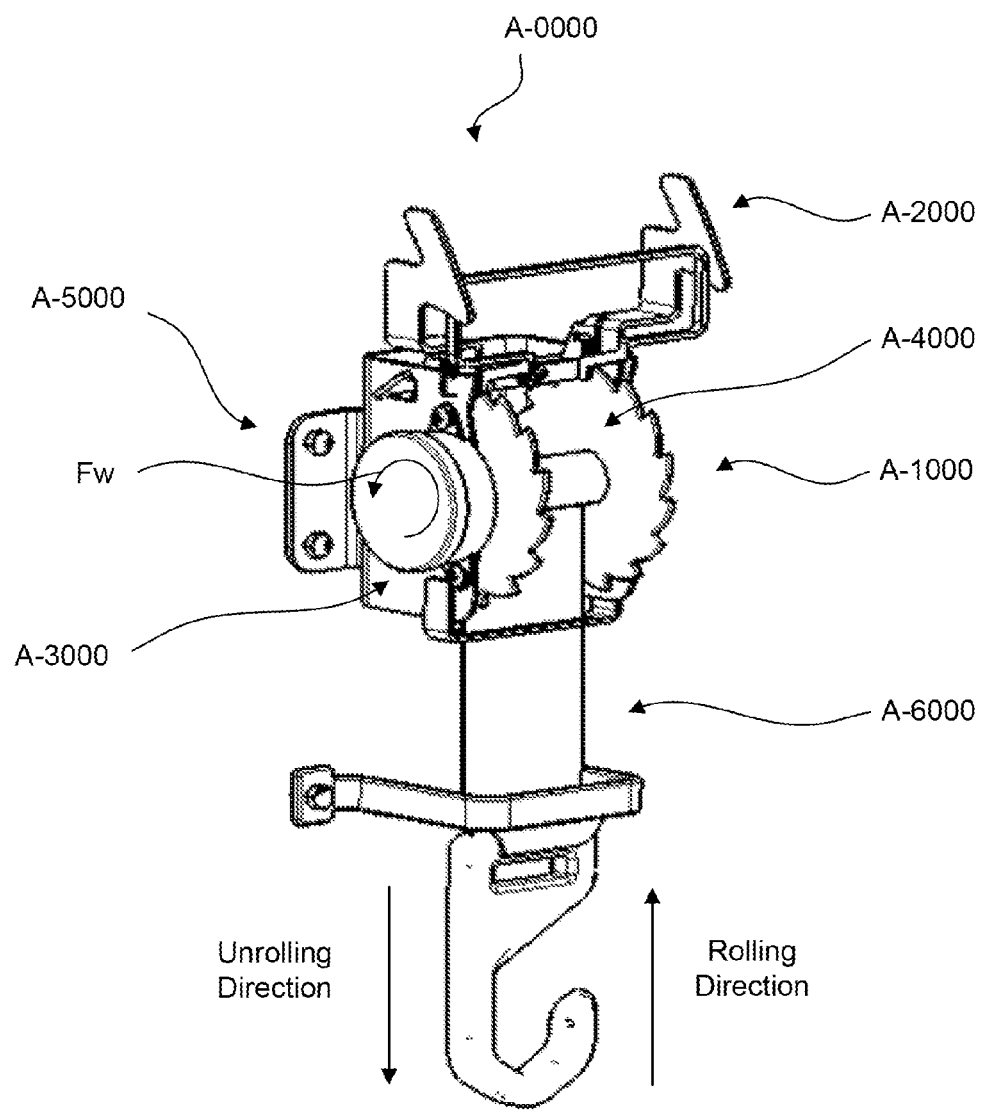
FIG. 2A is an assembled view of the tie down assembly, according to certain aspects of the disclosure.
Figure 2A:

The fastening device 1000 can include a tie down assembly A-0000, see FIG. 2A, affixed to a body 110 of a vehicle 100, e.g. a bed truck as illustrated in FIG. 1A, a top cover assembly B-2000 that covers the tie down assembly A-0000, see FIG. 2A, and a side cover assembly B-1000 that slidably frames the tie down assembly A-0000, see FIG. 2A.

The top cover assembly B-2000 can provide protection for the tie down assembly A-0000 against external elements, e.g. rain, dust, or the like, chocks, and/or damages, as well as an improved appearance of the fastening device 1000 by providing a substantially smooth and/or continue surface.

The side cover assembly B-1000 can provide side protection for the tie down assembly A-0000 against external elements, chocks, and/or damages, as well as an improved appearance of the fastening device 1000 and/or the vehicle 100 by providing surface continuity.

The side cover assembly B-1000 can include inter side panels B-1100 that can be positioned between two fastening devices 1000 positioned side by side along a wall 120 of the body 110 of a vehicle 100, as illustrated in FIG. 1A, and end side panel B-1200 that can be positioned on a side of the fastening device 1000 at a terminal end of the wall 120, as illustrated in FIG. 1A.

In addition, the inter side panels B-1100 can be shaped to match the body 110 of the vehicle 100. For example, the inter side panels B-1100 can include a side cover cutout B-1110 to match a wheel passage 130 of the vehicle 100.

The tie down assembly A-0000 can provide storage, dispensing, and tightening of a strap A-6100 that can be used to fasten the cargo in the vehicle 100.

As illustrated in FIG. 1A several fastening devices 1000 with several tie down assemblies A-0000, top cover assemblies B-2000, and side cover assemblies B-1000 can be placed on the walls 120 of the vehicle 100 to fasten the cargo.

Figure 2B:
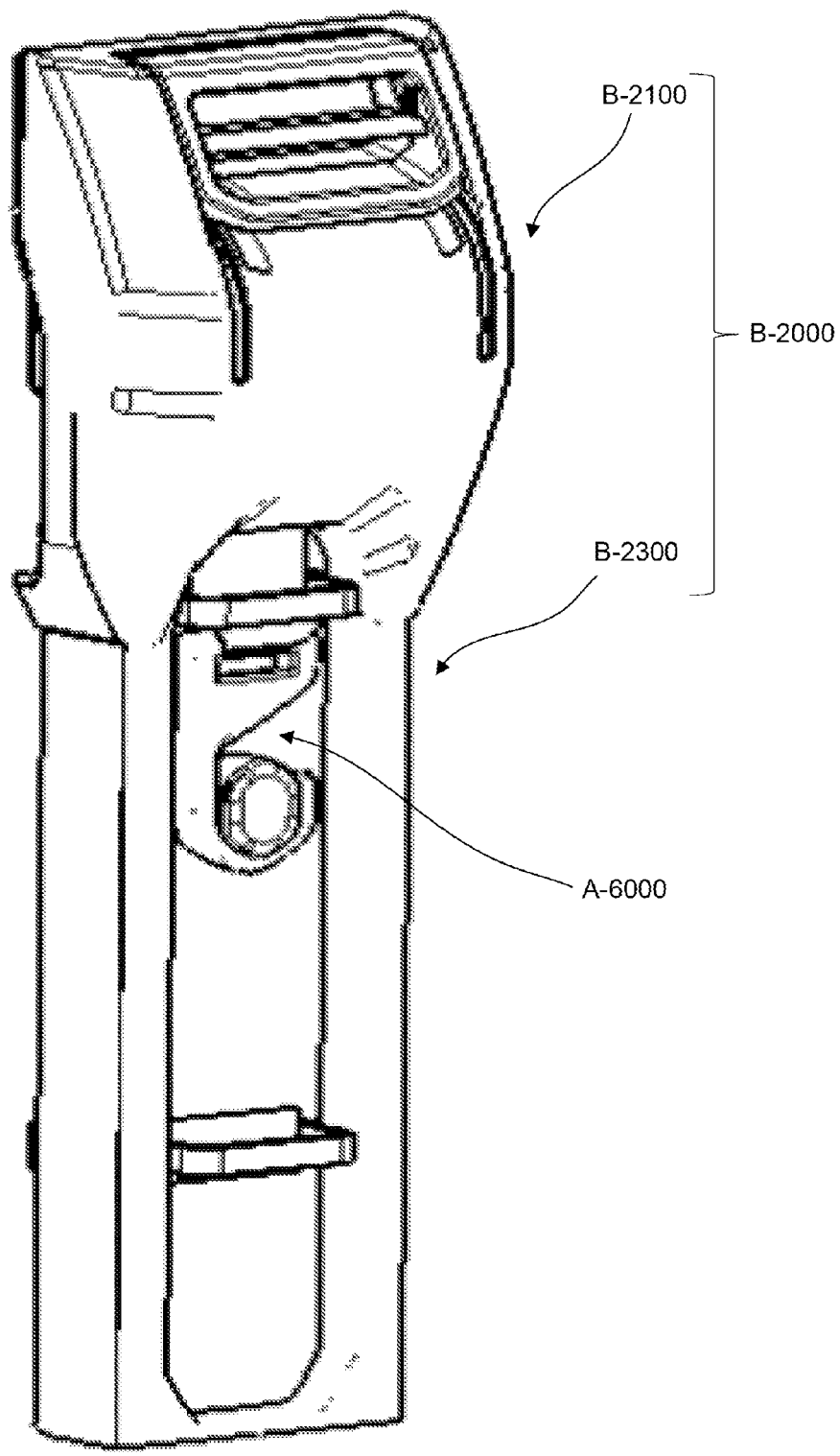
FIG. 2B is an assembled view of the tie down assembly and the top cover assembly, according to certain aspects of the disclosure.
Figure 2C:
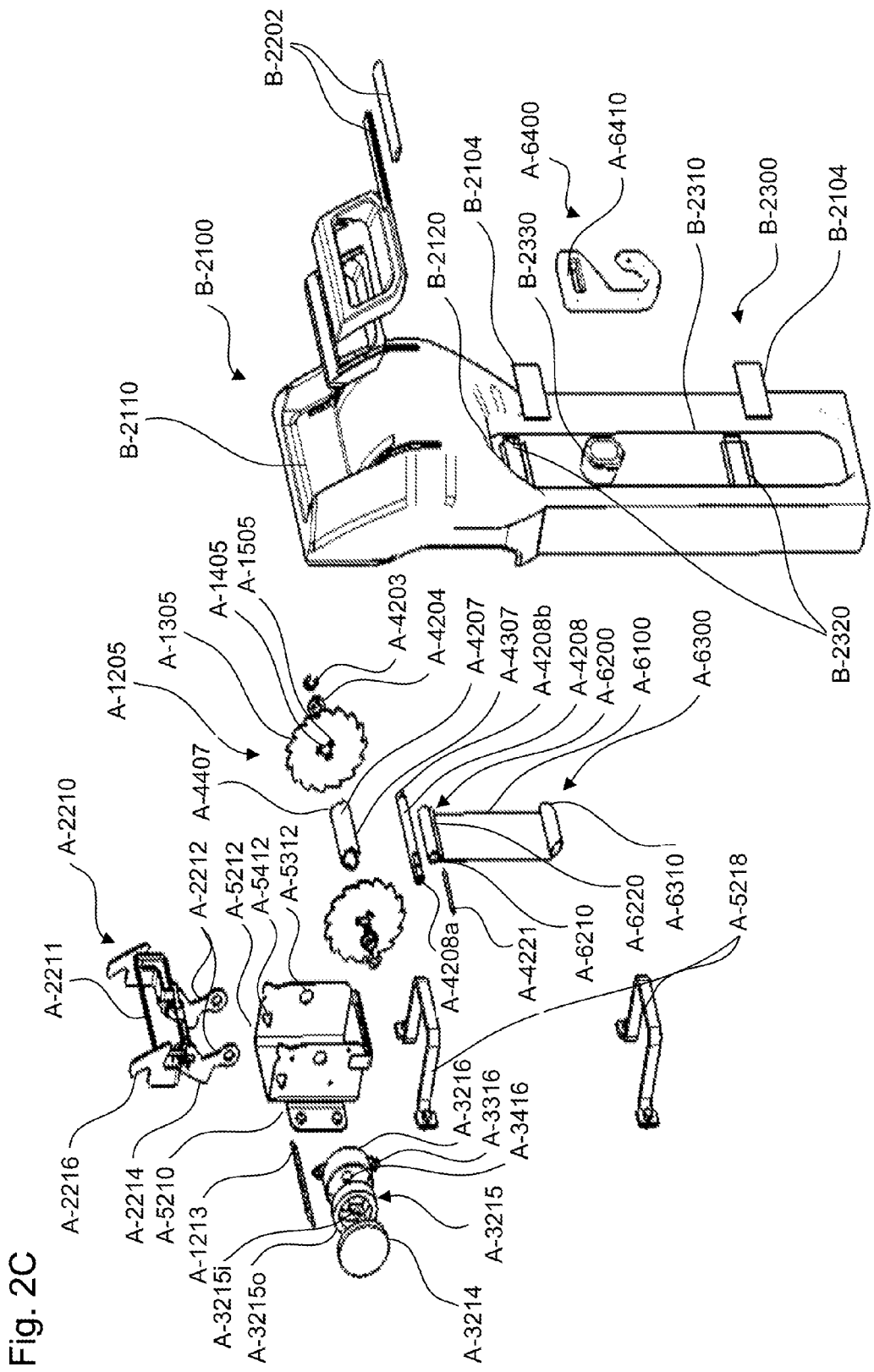
FIG. 2C is an exploded view of the tie down assembly and the top cover assembly, according to certain aspects of the disclosure.

FIGS. 2A-2C are an assembled view the tie down assembly A-0000, an assembled view of the tie down assembly A-0000 and top cover assembly B-2000, and an exploded view of the tie down assembly A-0000 and the top cover assembly B-2000, according to certain aspects of the disclosure.

The tie down assembly A-0000 can include a strap assembly A-6000, a shaft assembly A-4000 affixed to an terminal extremity of the strap assembly A-6000, a ratchet assembly A-1000 connected to the shaft assembly A-4000, a handle assembly A-2000 connected to the ratchet assembly A-1000, a spring assembly A-3000 connected to the shaft assembly A-4000, and a housing assembly A-5000 affixed to the body 110 of the vehicle 100.

The strap assembly A-6000 provides means to temporally affix a cargo on the vehicle 100.

The shaft assembly A-4000 provides support, rolling and unrolling of the strap assembly A-6000.

The ratchet assembly A-1000 provides rotation of the shaft assembly A-4000 in a rolling direction, e.g. clock wise, prevents rotation of the shaft assembly A-4000 in an unrolling direction opposite to the rolling direction, e.g. clock wise, when engaged, and provides rotation of the shaft assembly A-4000 in the unrolling direction, when disengaged.

The handle assembly A-2000 provides engagement of the ratchet assembly A-1000 to roll and tighten the strap assembly A-6000 and disengagement of the ratchet assembly A-1000 to rewind the strap assembly A-6000 under the action of the spring assembly A-3000.

The spring assembly A-3000 provides a predetermined rewinding force Fw to rewind the strap assembly A-6000 when the handle assembly A-2000 disengages the ratchet assembly A-1000.

The housing assembly A-5000 provides support between the body 110 of the vehicle 100 and the combination of the shaft assembly A-4000, the handle assembly A-2000, the ratchet assembly A-1000, and the spring assembly A-3000.

Under action of the user, the handle assembly A-2000 can contact the ratchet assembly A-1000 to roll the strap A-6100 around the shaft assembly A-4000 and provide tightening. In addition, the handle assembly A-2000 disengages the ratchet assembly A-1000 to fully roll the strap assembly A-6000 around the shaft assembly A-4000 and provide rewinding of the strap assembly A-6000.

The strap assembly A-6000 can include a strap A-6100, a first strap extremity A-6200 affixed to the shaft assembly A-4000, a second strap extremity A-6300, and a hook A-6400 affixed to the second strap extremity A-6300.

The first strap extremity A-6200 can include a first main loop A-6210, and a first secondary loop A-6220 positioned below the first main loop A-6210. The second strap extremity A-6300 can include a V-shaped loop A-6310. The hook A-6400 can include a hook loop A-6410 that is laced with the V-shaped loop A-6310.

The shaft assembly A-4000 can include a shaft A-4208, a strap pin A-4221 surrounding the shaft A-4208, a pulley sleeve A-4207 extending along a shaft length, a pair of shaft bearings A-4204 affixed to two shaft extremities A-4208ab, and a pair of retaining rings A-4203 affixed to the two shaft extremities A-4208ab and positioned outwardly from the pair of sleeve bearings A-4204.

The shaft A-4208 can provide support for the first strap extremity, the strap pin A-4221 and the pulley sleeve A-4207 can provide fixation of the first strap extremity to the strap assembly A-6000, the pair of shaft bearings A-4204 reduce rotational friction and allow smooth rotation of the shaft A-4208, and the retaining rings A-4203 maintain the shaft A-4208 in place.

The pulley sleeve A-4207 can include an pulley sleeve notch A-4307 extending along a full length of the pulley sleeve A-4207, and a plurality of sleeve teeth A-4407 extending longitudinally from terminal ends of the pulley sleeve A-4207.

The ratchet assembly A-1000 can include a pair of ratchet gears A-1205 affixed to the two shaft extremities A-4208ab and the pulley sleeve A-4207, and a ratchet detent A-1213 extending between the pair of ratchet gears A-1205 and substantially parallel to the shaft A-4208.

Each ratchet gear of the pair of ratchet gears A-1205 can include a plurality of ratchet gear teeth A-1305 positioned radially around a peripheral portion of each ratchet gear A-1205, a ratchet gear hole A-1405 positioned centrally, and a plurality of ratchet gear openings A-1505 that surrounds the ratchet gear hole A-1405.

The ratchet detent A-1213 can be forced by a retention device, e.g. spring, against the plurality of ratchet gear teeth A-1305 to lock the pair of ratchet gears A-1205 and prevent rotation of the pair of ratchet gears A-1205 in the unrolling direction.

The shaft A-4208 can be inserted through the first main loop A-6210 and the strap pin A-4221 is inserted through the first secondary loop A-6220. The pulley sleeve A-4207 can be inserted along the shaft A-4208 with the pulley sleeve notch A-4307 positioned between the first main loop A-6210 and the first secondary loop A-6220 to have the strap A-6100 winding around the pulley sleeve A-4207.

The pair of shaft bearings A-4204 can be inserted into the ratchet gear holes A-1405 and the shaft extremities A-4208ab can be inserted into the pair of shaft bearings A-4204 to have shaft A-4208 rotatably affixed to the pair of ratchet gears A-1205.

The plurality of sleeve teeth A-4407 can be inserted into the plurality of ratchet gear openings A-1505 to have the pulley sleeve A-4207 affixed to the pair of ratchet gears A-1205 and rotating with the pair of ratchet gears A-1205.

The handle assembly A-2000 can include a handle support A-2210 rotatably affixed to the shaft A-4208, and a release lever A-2211 rotatably affixed to the handle support A-2210.

The handle support A-2210 can include a pair of support arms A-2212 rotatably affixed to the shaft extremities A-4208ab, a pair of support elbows A-2214 protruding backwardly from the pair of support arms A-2212, and a pair of support legs A-2216 protruding upwardly from the pair of support elbows A-2214.

The pair of support arms A-2212 can provide support and rotation for the pair of support elbows A-2214 and the pair of support legs A-2216. The pair of support legs A-2216 can provide a support reachable by the user to rotate the handle support A-2210. Under rotation of the handle support A-2210, the pair of support elbows A-2214 can contact the ratchet detent A-1213 and disengage the ratchet detent A-1213 from the plurality of ratchet gear teeth A-1305 and unlock the rotation of the pair of ratchet gears A-1205 in the rolling direction.

Under the action of the user, the release lever A-2211 contacts the ratchet gear teeth A-1305 and force the pulley sleeve A-4207 to rotate with the pair of ratchet gears A-1205. The rotation of the pair of ratchet gears A-1205 rolls the strap A-6100 around the pulley sleeve A-4207 to exert tightening forces on the cargo. As the pair of ratchet gears A-1205 rotates, the ratchet detent A-1213 successively disengages and engages along the ratchet gear teeth A-1305 to lock the pair of ratchet gears A-1205 in placed and avoid the unrolling of the strap A-6100 due to reciprocal tightening forces exerted on the strap A-6100 by the cargo.

The spring assembly A-3000 can include a spring housing base A-3216 affixed to the housing assembly A-5000 and inserted through one of the shaft extremity A-4208a, a spring A-3215 inserted in the spring housing base A-3216, and a spring housing lid A-3214 affixed to the spring housing base A-3216.

The spring housing base A-3216 can include a plurality of spring housing base legs A-3416 to provide fixation to the housing assembly A-5000, a spring housing base hole A-3316 to receive the shaft extremity A-4208a.

The spring A-3215 can include a spring inner end A-3215i affixed to the shaft extremity A-4208a and a spring outer portion A-3215o affixed to the spring housing base A-3216 to generate between the spring housing base A-3216 and the shaft A-4208 the predetermined rewinding force Fw.

Under the action of the user, the pair of support elbows A-2214 contacts the ratchet detent A-1213 and disengages the ratchet detent A-1213 from the ratchet gear teeth A-1305 and allows the spring A-3215 to rotates the pair of ratchet gears A-1205 and rewind the strap A-6100.

The housing assembly A-5000 can include a bracket A-5210 affixed to the body 110, a housing A-5212 affixed to the bracket A-5210, a pair of strap bars A-5218 affixed to the body 110 and extending along a length of the strap A-6100.

The housing A-5212 can include a pair of housing shaft holes A-5312 that receives the pair of shaft bearings A-4204, and a pair of ratchet detent holes A-5412 that receives the ratchet detent A-1213.

Each strap bar of the pair of strap bars A-5218 can have a square shape to provide guidance for the strap A-6100. In addition, the pair of strap bars A-5218 can be made of metallic alloys, e.g. steel alloys, and/or aluminum alloys, and fasten to the body 110 via fastening devices, e.g. bolts, rivets, adhesive, and/or welding technics, to provide retention and/or attachment mean for the hook A-6400, e.g. when the hook A-6400 is engaged into the strap bar A-5218.

Alternative, the pair of strap bars A-5218 can include more than two strap bars to enhance the guidance of the strap A-6100 and/or increase the attachment possibility of the hook A-6400 onto one of the strap bar A-5218.

The top cover assembly B-2000 can include a head cover B-2100 that covers the tie down assembly A-0000, a neck cover B-2300 that protrudes downwardly from the head cover B-2100 to receive the strap A-6100 and the hook A-6400, a pair of handle covers B-2201 that covers the pair of support legs A-2216 of the handle assembly A-2000 to enhance ergonomic comfort, a pair of release lever covers B-2202 that covers the release lever A-2211 of the handle assembly A-2000 to enhance ergonomic comfort, and a pair of strap bar covers B-2104 that covers the pair of strap bars A-5218 of the housing assembly A-5000.

The head cover B-2100 can include a top head cover opening B-2110 positioned at an upper portion of the head cover B-2100, and a bottom head cover opening B-2120 positioned at a lower portion of the head cover B-2100.

The top head cover opening B-2110 opens on the release lever A-2211 and receives the pair of handle covers B-2201 while the bottom head cover opening B-2120 opens on strap pin A-4221 of the shaft assembly A-4000 and receives the strap A-6100.

The neck cover B-2300 can include a neck groove B-2310 extending between the bottom head cover opening B-2120 and a terminal end of the neck cover B-2300, a pair of neck openings B-2320 that faces the pair of strap bars A-5218, and a neck stop B-2330 positioned between the pair of neck openings B-2320 and protruding from the neck groove B-2310.

The neck groove B-2310 can receive the second strap extremity A-6300 and the hook A-6400, the pair of neck openings B-2320 can provide openings for the pair of strap bars A-5218 and receive the pair of strap bar covers B-2104, and the neck stop B-2330 can hook on the hook A-6400 to provide retention means for the strap A-6100.

The bracket A-5210 can be fasten to the body 110 via fastening devices, e.g. bolts, rivets, adhesive, and/or welding technics.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A fastening device integrated into a vehicle to fasten a cargo, comprising:
   a strap assembly having:
      a strap, and
      a hook affixed to a first extremity of the strap;
   a shaft assembly affixed to a second extremity of the strap to roll the strap;
   a ratchet assembly affixed to the shaft assembly to prevent rotation of the shaft assembly in an unrolling direction;
   a handle assembly to engage and force the ratchet assembly to rotate;
   a housing assembly affixed to the body of the vehicle to support the shaft assembly, and the handle assembly;
   a head cover to cover the shaft assembly, the ratchet assembly, and the housing assembly and provide access to the handle assembly; and
   a neck cover that protrudes downwardly from the head cover to receive the strap and the hook, wherein
      the handle assembly is articulable to engage the ratchet assembly and tighten the strap around the cargo.

2. The fastening device of claim 1, wherein the handle assembly further includes a release lever to articulate the handle assembly and tighten the strap around the cargo.

3. The fastening device of claim 2, wherein the release lever is covered by a pair of release lever covers to enhance ergonomic comfort.

4. The fastening device of claim 1, wherein the neck cover includes a groove to receive the strap and the hook.

5. The fastening device of claim 4, wherein the housing assembly includes a pair of strap bars affixed to the body and protruding from the groove to guide the strap through the shaft assembly.

6. The fastening device of claim 5, wherein the neck cover further includes a stop between the pair of strap bars to retain the hook.

7. The fastening device of claim 1, wherein the shaft assembly includes a shaft inserted into a main loop of the second extremity of the strap and extending between a pair of ratchet gears of the ratchet assembly.

8. The fastening device of claim 7, wherein the shaft assembly further includes a sleeve inserted along the shaft and affixed to the pair of ratchet gears.

9. The fastening device of claim 1, further including a side panel laterally affixable to at least one of the head cover and the neck cover.

10. A fastening device integrated into a vehicle to fasten a cargo, comprising:
    a strap assembly having:
       a strap, and
       a hook affixed to a first extremity of the strap;
    a shaft assembly affixed to a second extremity of the strap to roll the strap;
    a ratchet assembly affixed to the shaft assembly to prevent rotation of the shaft assembly in an unrolling direction when engaged and allow rotation of the shaft assembly in the unrolling direction when disengaged;
    a handle assembly to engage and force the ratchet assembly to rotate;
    a spring assembly to exert a rewinding force on the shaft assembly;
    a housing assembly affixed to the body of the vehicle to support the shaft assembly, the handle assembly, and the spring assembly;
    a head cover to cover the shaft assembly, the ratchet assembly, the spring assembly, and the housing assembly and provide access to the handle assembly; and
    a neck cover that protrudes downwardly from the head cover to receive the strap and the hook, wherein
       the handle assembly is articulable to engage the ratchet assembly and tighten the strap around the cargo or disengage the ratchet assembly and rewind the strap assembly around the shaft assembly.

11. The fastening device of claim 10, wherein the handle assembly further includes a release lever to articulate the handle assembly and tighten the strap around the cargo.

12. The fastening device of claim 11, wherein the release lever is covered by a pair of release lever covers to enhance ergonomic comfort.

13. The fastening device of claim 10, wherein the handle assembly further includes a handle support to disengage the handle assembly and rewind the strap around the shaft assembly through the spring assembly.

14. The fastening device of claim 13, including a pair of support legs covered by a pair of handle covers to enhance ergonomic comfort.

15. The fastening device of claim 10, wherein the neck cover includes a groove to receive the strap and the hook.

16. The fastening device of claim 15, wherein the housing assembly includes a pair of strap bars affixed to the body and protruding from the groove to guide the strap through the shaft assembly.

17. The fastening device of claim 16, wherein the neck cover further includes a stop between the pair of strap bars to retain the hook.

18. The fastening device of claim 10, wherein the shaft assembly includes a shaft inserted into a main loop of the second extremity of the strap and extending between a pair of ratchet gears of the ratchet assembly.

19. The fastening device of claim 18, wherein the shaft assembly further includes a sleeve inserted along the shaft and affixed to the pair of ratchet gears.

20. The fastening device of claim 10, further including a side panel laterally affixable to at least one of the head cover and the neck cover.

* * * * *